US008818117B2

(12) United States Patent
Liu et al.

(10) Patent No.: US 8,818,117 B2
(45) Date of Patent: Aug. 26, 2014

(54) METHOD AND APPARATUS FOR COMPRESSING Z-STACK MICROSCOPY IMAGES

(75) Inventors: Ming-Chang Liu, San Jose, CA (US); Mark Robertson, Cupertino, CA (US)

(73) Assignee: Sony Corporation, Tokyo (JP)

( * ) Notice: Subject to any disclaimer, the term of this patent is extended or adjusted under 35 U.S.C. 154(b) by 61 days.

(21) Appl. No.: 13/553,428

(22) Filed: Jul. 19, 2012

(65) Prior Publication Data
US 2014/0023283 A1   Jan. 23, 2014

(51) Int. Cl.
*G06K 9/36*   (2006.01)

(52) U.S. Cl.
USPC .............................. 382/232; 382/233; 382/236

(58) Field of Classification Search
USPC ......... 382/109, 133, 154, 159, 232, 233, 298, 382/236; 514/397; 548/311.4, 314.7; 435/4, 435/326, 375, 377, 366; 424/184.1, 185.1
See application file for complete search history.

(56) References Cited

U.S. PATENT DOCUMENTS

| | | | |
|---|---|---|---|
| 6,456,285 B2 | 9/2002 | Hayhurst | |
| 7,372,985 B2 * | 5/2008 | So et al. | 382/133 |
| 7,593,581 B2 | 9/2009 | Hecht et al. | |
| 7,724,937 B2 * | 5/2010 | So et al. | 382/133 |
| 8,252,829 B2 * | 8/2012 | Duggan | 514/397 |
| 8,331,627 B2 * | 12/2012 | Xiong et al. | 382/109 |

FOREIGN PATENT DOCUMENTS

| | | | |
|---|---|---|---|
| JP | 2005198801 A | 7/2005 | |
| JP | 2011150400 A | 8/2011 | |

OTHER PUBLICATIONS

Won-Ki Keong et al., "Interactive Histology of Large-Scale Biomedical Image Stacks", manuscript received Mar. 31, 2010; accepted Aug. 1, 2010; posted online Oct. 24, 2010; mailed on Oct. 16, 2010, 10 pages.

Office Action dated May 26, 2010, Japan Patent Application No. 2013-142662, 11 pages.

* cited by examiner

*Primary Examiner* — Anh Do
(74) *Attorney, Agent, or Firm* — Moser Taboada

(57) ABSTRACT

A method and apparatus for compressing Z-stack microscopy images comprising compressing an all-focus image and depth map representation of an original Z-stack of images, computing a prediction residual as a difference between a simulated Z-stack, generated from the all-focus image and the depth-map, and the original Z-stack and concatenating the prediction residual to the compressed all-focus image and the depth map to produce a final compressed file.

20 Claims, 8 Drawing Sheets

400 402

METHOD AND APPARATUS FOR COMPRESSING Z-STACK MICROSCOPY IMAGES

BACKGROUND

1. Field of the Invention

Embodiments of the present invention generally relate to digital microscopy and, more specifically, to a method and apparatus for compressing Z-stack digital microscopy images.

2. Description of the Related Art

A digital microscope images a specimen at different depths to create a sequence of digital images. Each image represents a portion of the specimen at a particular depth of focus. Thus, at a certain depth, only a fraction of the entire specimen is in focus. The sequence of digital images is stacked along a Z dimension corresponding to depth, referred to as a Z-stack. Each image in a Z-stack is focused at a different depth in the captured specimen. The optics of digital microscopes impose a very narrow depth of field, too small to capture the entire specimen in focus with a single picture. Thus, all images in the Z-stack are of the same specimen, but with different focus for each image.

Z-stacks are generally large sized data sets with high resolution, which impose high bandwidth requirements for the storage or transmission of the Z-stack. For example, in several applications, the number of images is 15, 30, or 50, each with a spatial resolution of approximately 100,000 pixels by 100,000 pixels, which imposes high bandwidth requirements for the storage or transmission of Z-stack.

According to some conventional methods for compressing a Z-stack, the digital images in the Z-stack are compressed individually. While simple to implement, such methods for compressing a Z-stack result in large data files. Due to the large size of data files, there are delays in viewing the Z-stack over a bandwidth-constrained (or bandwidth limited) channel. Video compression techniques are also utilized in the field, however video compression delays viewing of the data due to frame-by-frame representation of the Z-stack images.

Thus, there is a need for method and apparatus for compressing a Z-stack of microscopy images.

SUMMARY OF THE INVENTION

An apparatus and/or method for compressing Z-stack microscopy images, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Disclosed herein is an apparatus and/or a method for compressing microscopy Z-stack images, substantially as shown in and/or described in connection with at least one of the figures, as set forth more completely in the claims. According to an embodiment of the present invention, an all-focus image and depth map of a specimen are compressed according to a method known to those of ordinary skill in the art such as JPEG, JPEG-LS, and JPEG 2000, although numerous other possibilities may work equally well. Depth of field is simulated from a Z-stack to produce a simulated Z-stack, as described in the commonly assigned and related pending U.S. patent application Ser. No. 13/553,434, filed Jul. 19, 2012. The approximated/simulated Z-stack is subtracted from the original Z-stack to obtain a prediction residual and then compressed similarly as the all-focus image. The compressed prediction residual is concatenated to the all-focus image and the depth map as a file to produce the final compressed result.

Figure 1:
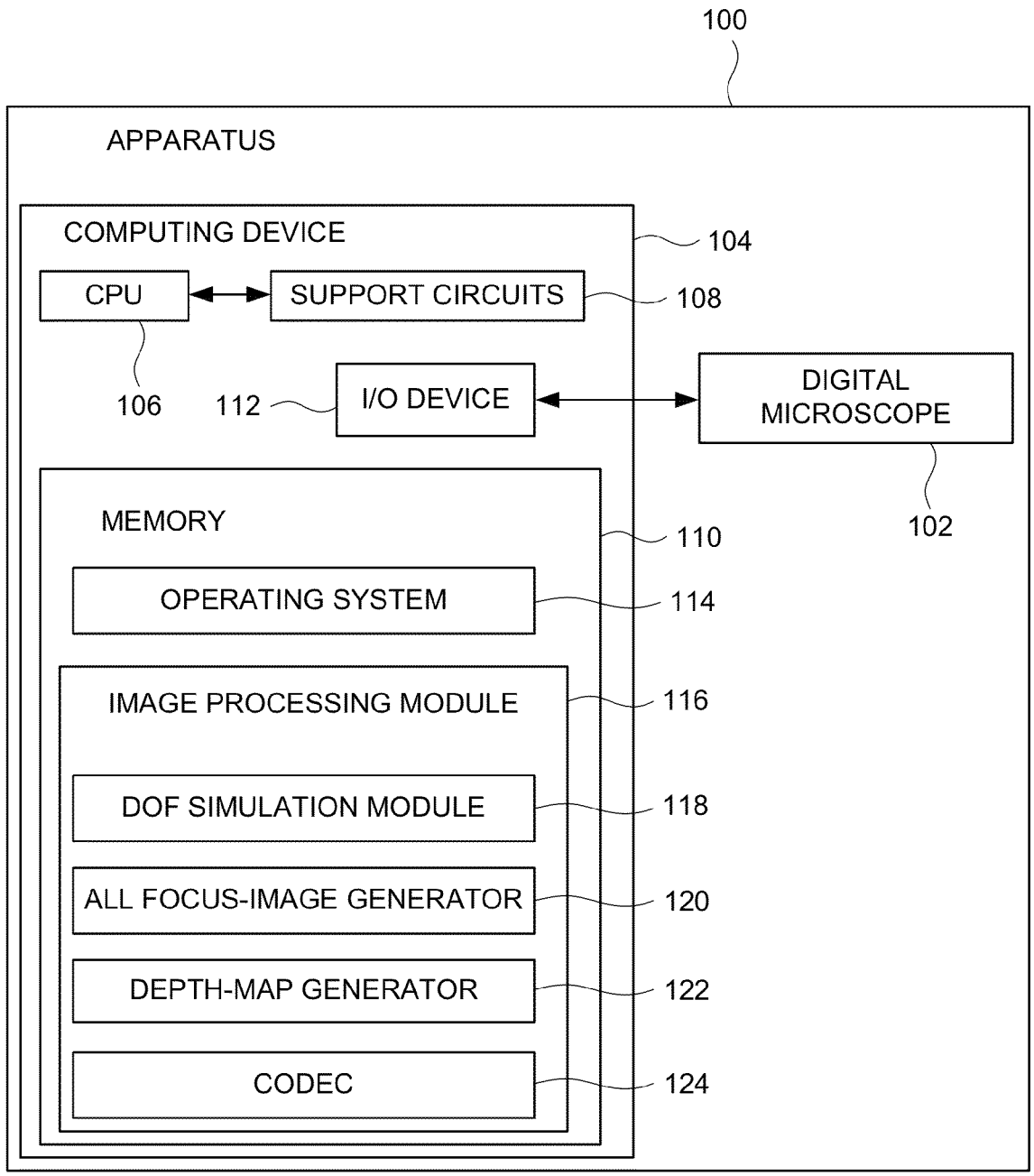
FIG. 1 depicts a block diagram of apparatus for processing images in microscopy using a digital microscope, in accordance with exemplary embodiments of the present invention.

FIG. 1 depicts a block diagram of apparatus 100 for compressing Z-stack microscopy images using a digital microscope 102, in accordance with exemplary embodiments of the present invention.

The digital microscope 102 captures digital images of a specimen at different depths for creating a sequence of images. The digital microscope 102 images the specimen at different depths to create the sequence of digital images. For purposes of illustration, the sequence of digital images is represented by following Expression A: $I(x, y, z)$, where $(x, y)$ is a spatial index with $x=0$ to $X-1$ and $y=0$ to $Y-1$ and $z$ is a depth index with $z=0$ to $Z-1$ [Expression A].

In certain embodiments, the digital microscope 102 is coupled to the computing device 104. In other embodiments, a stack of images is created by the microscope 102 and transferred to the computing device 104, e.g., via memory stick, compact disk, network connection or the like.

The computing device 104 comprises a Central Processing Unit (or CPU) 106, support circuits 108, a memory 110 and an I/O device 112. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, and the like. The memory 110 comprises at least one of Read Only Memory (ROM), Random Access Memory (RAM), disk drive storage, optical storage, removable storage and/or the like.

The memory 110 comprises an Operating System (OS) 114 and an image processing module 116. The image processing module 116 facilitates compression and progressive transmission of the sequence of images of a specimen captured using the digital microscope 102. The image processing module 116 comprises a Depth of Field (DOF) simulation module 118, an all focus-image generator 120, a depth-map generator 122 and a codec (or coder decoder module) 124.

The DOF simulation module 118 simulates the sequence of images of a specimen captured using the digital microscope 102. The DOF simulation module 118 generates a low-bandwidth approximation of the sequence of images by applying Point Spread Function (PSF) operations to each pixel of an all-focus image and a blur function to each pixel according to the depth of the pixel as dictated by the depth map. Specifically, the DOF simulation module 118 approximates the sequence of images by applying depth-dependent out-of-focus blurring to the all-focus image, thereby imparting a perception of depth of specimen to users in browsing through the sequence of images in order to simulate the functionality of scrolling through a Z-stack of images without actually storing the full sequence of images in the Z-stack.

The all focus-image generator 120 generates an all focus-image in accordance with the principles of the invention. The depth-map generator 122 generates a depth map. The codec 124 applies residual coding based on a prediction from the approximated sequence of images thereby facilitating compression.

As used herein, the term "all-focus image" refers to the reduction of a Z-stack of a sequence of images of a specimen on a slide from three dimensions to two dimensions such that the result contains the entire specimen in focus, i.e., out of focus information is removed. The all-focus image is formed by weighting each image according to a particular measure and combining the weighted images accordingly, as described in commonly assigned U.S. patent application Ser. No. 13/553,265, filed Jul. 19, 2012, hereby incorporated by reference in its entirety.

The all-focus image is a composite of portions of the images in the Z-stack that are in focus at each focus depth without the out-of-focus blur. The all-focus image is represented by following Expression B: $I_\infty(x, y)$ [Expression B]. In order to determine the all-focus image, the depth-map generator 120 generates a depth at each pixel to indicate which image of the Z-stack has the best focus at that pixel, where depths for each pixel form a depth-map. The depth-map is represented by following Expression C: $d(x, y)$ [Expression C].

Figure 2:
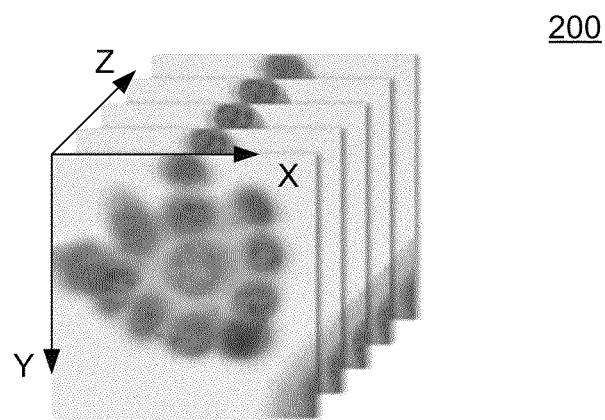
FIG. 2 depicts an example Z-stack, in accordance with exemplary embodiments of the present invention.

FIG. 2 depicts an example Z-stack 200 generated by the digital microscope 102. Each image in the Z-stack is focused at a different depth in the specimen. The digital microscope 102 captures digital images of a specimen at different focus depths to create a sequence of images. Thus, focus depth is incremented throughout the depth of the specimen to capture the entire specimen in focus in at least one of the digital images. The sequence of digital images is stacked along the Z dimension corresponding to depth.

Figure 3:
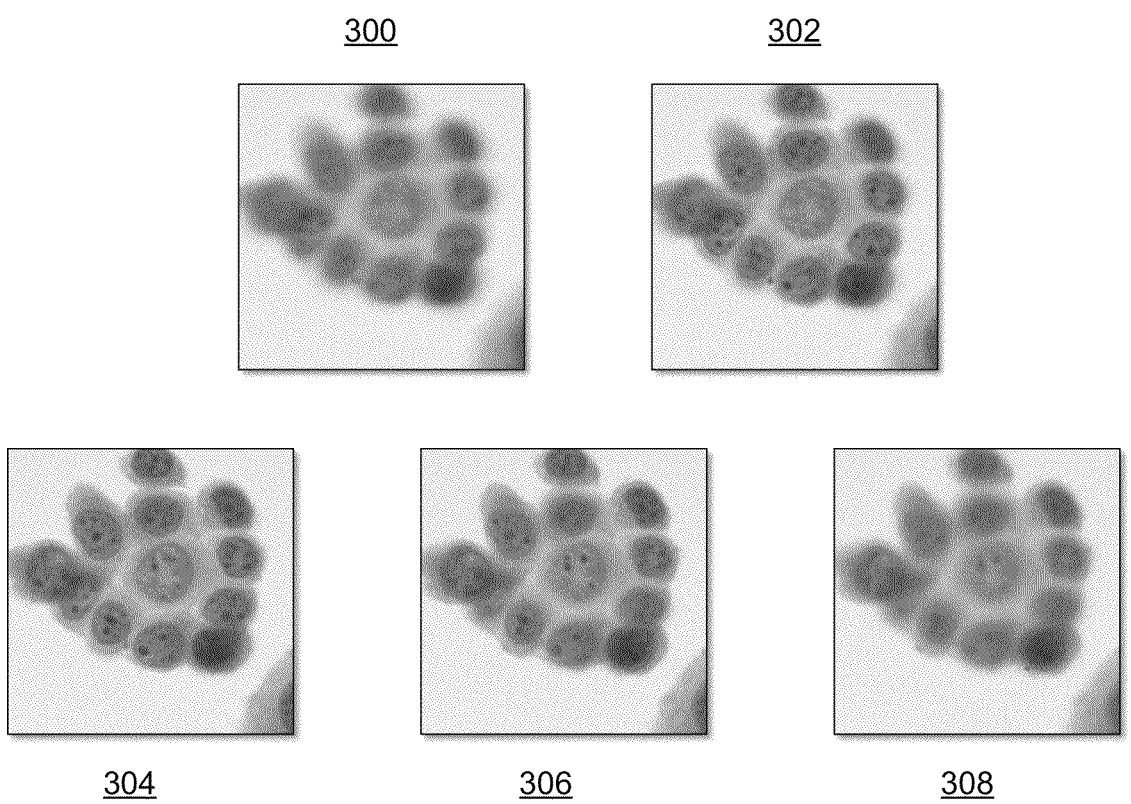
FIG. 3 depicts five individual slices of digital images of FIG. 2, in accordance with exemplary embodiments of the present invention.

FIG. 3 depicts five individual images of the Z-stack 200 shown in FIG. 2, in accordance with exemplary embodiments of the present invention. FIG. 3 illustrates images 300, 302, 304, 306 and 308, each at different Z depths. For example, when a user of a digital microscope initially views a slide of a specimen, image 302 appears. If the user wishes to adjust the focus to a different Z depth, image 304 appears, and so on, forming the Z-stack 200 shown in FIG. 2.

Figure 4:
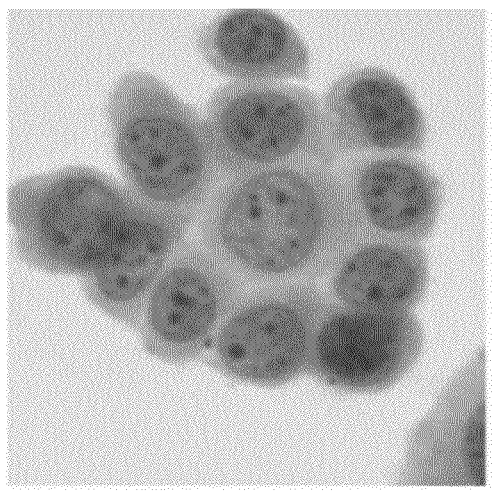
FIG. 4 depicts example of all-focus image and depth-map for snapshots shown in FIGS. 2 and 3.
Figure 4:
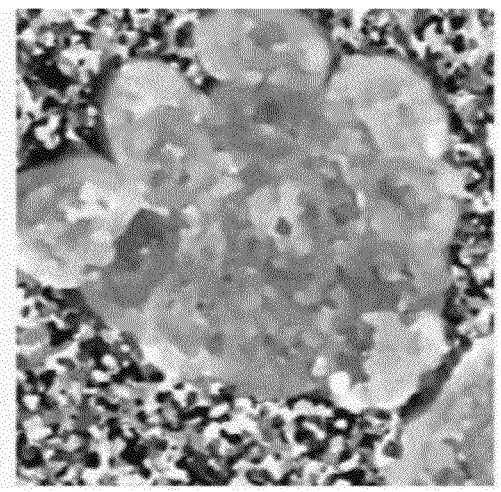

In some applications, there are a large number of images in the Z-stack, for example 15, 30, or 50. This imposes high bandwidth requirements for the storage or transmission of the z-stack. FIG. 4 shows example results of processing according to some embodiments of this invention for producing a depth map. The original data set, i.e. Z-stack, contains, for example, 50 images, several of which are shown in FIGS. 2 and 3. In the FIG. 4, image 400 is the all-focus image, and the image 402 is a depth-map computed at each pixel to indicate which image of the z-stack had the best focus at that pixel. The depth map enables the DOF simulation module 118 to determine which Z-stack image to display for a particular pixel or region of an image of a specimen.

In certain embodiments, the all-focus image is a suitable replacement of the original Z-stack data. However, in many scenarios, the user has to interpret the Z-stack data based on out-of-focus and depth-dependent blur. Still however, storage and transmission of Z-stack is problematic. The large size of the Z-stack data often occupies excessive disk space in storage systems, and imposes bandwidth constraints. The large size of the Z-stack data and bandwidth constraints cause noticeable and objectionable delays in viewing the Z-stack data.

Figure 5:
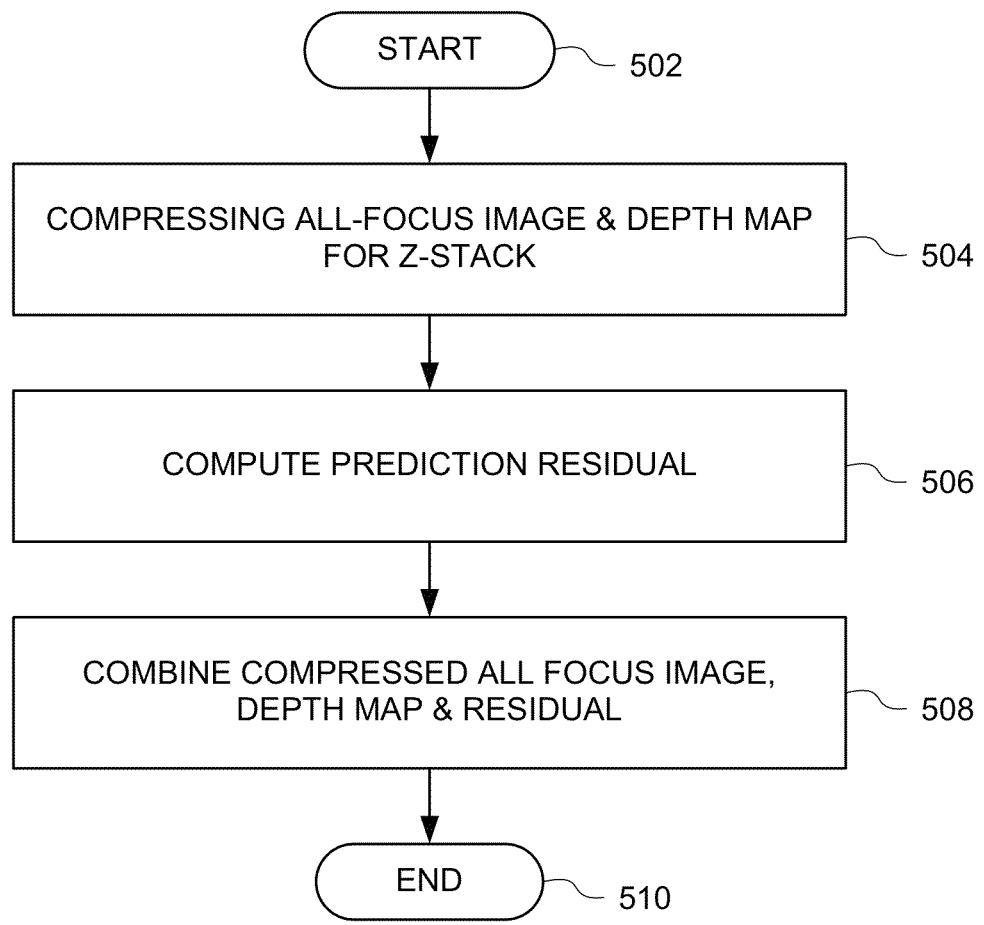
FIG. 5 is a flow diagram of a method 500 for compressing Z-stack microscopy images, in accordance with exemplary embodiments of the present invention.

FIG. 5 is a flow diagram of a method 500 for compressing Z-stack microscopy images, in accordance with exemplary embodiments of the present invention.

The method 500 is an exemplary implementation of the image processing module 116 as executed by the CPU 106. The image processing module 116 comprises a DOF simulation module 118, an all focus-image generator 120, a depth-map generator 122 and a codec (or coder decoder module) 124.

The method 500 begins at step 502 and proceeds to step 504. At step 504, the method 500 compresses an all-focus image and a depth map of images in a Z-stack captured using the microscope 102. The all-focus image and depth map are generated according to the correlated, co-pending 3513 application based on the Z-stack images.

The method then proceeds to step 506, where the codec 124 computes a prediction residual. The prediction residual is computed by subtracting a simulation of the Z-stack from the original Z-stack images. The simulation, or approximation, of the Z-stack is described in the 3832 application, as discussed above. After subtracting the simulation Z-stack from the original Z-stack, the prediction residual remains. The subtraction is performed, according to an exemplary embodiment, on a pixel-by-pixel difference basis.

At step 508, the image processing module 116 combines the compressed all-focus image, depth map and the prediction residual into a final compressed result. The final compressed result contains the required data to recreate the original Z-stack once the result is transmitted to a remote computer system, or the like. The method ends at step 510.

Figure 6:
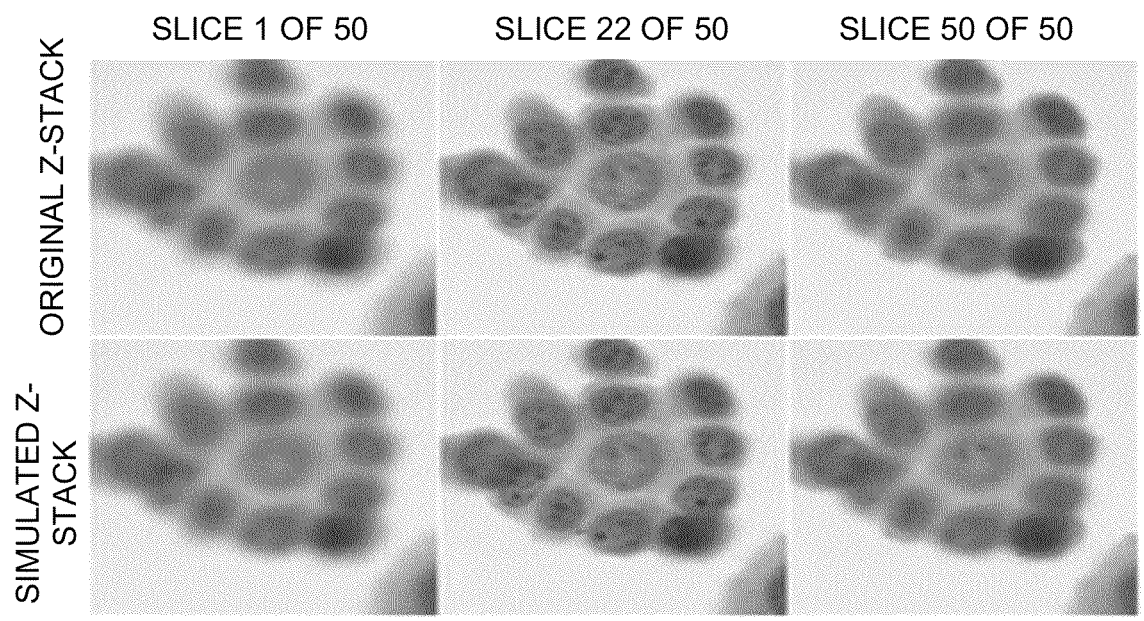
FIG. 6 depicts three images in a Z-stack (top), and corresponding three images of the simulated Z-stack, in accordance with exemplary embodiments of the present invention.

FIG. 6 depicts three images in a Z-stack, and corresponding three images of the simulated Z-stack. As shown in FIG. 6, the first row in the matrix of snapshots contains several images from the original Z-stack, and the second row shows the corresponding simulated images using the method for simulating DOF in microscopy in the 3832 application. The method for simulating DOF is implemented by the DOF simulation module 118. The method for simulating DOF comprises approximating a sequence of images captured by the microscope 102 using the depth map generated by the depth-map generator 122 and the all-focus image generated by the all focus-image generator 120.

As shown in FIG. 6, the original Z-stack and simulated images are visually similar. The left and right columns are the two extremes of the data set, and show significant amount of out-of-focus blur. In the right column, there is a small circular object that is in focus. In the central column, there are multiple regions that are in-focus and other regions that are out-of-focus. In all of the cases, the simulated Z-stack provides a good match with the original Z-stack, both for the in-focus regions and in the blurred out-of-focus regions. As apparent from FIG. 6, the similarity between the simulated and the original Z-stacks provide the basis for the compressing and transmitting microscopy images.

According to a common method for compressing images and sequences of images, an efficient prediction is created that approximates the original data, i.e. sequences of images. After subtracting the prediction from the original data, the difference (or prediction residual) has lower entropy and is compressed with fewer bits. In certain scenarios involving use of a low-bandwidth all-focus image and depth map to approximate the Z-stack, the residual between the approximated Z-stack and the original Z-stack has lower entropy than the original Z-stack, and thus is represented with fewer bits. In certain other scenarios, perception of reduced delay occurs in viewing the Z-stack on a remote client due to instant availability and accessibility of the approximated Z-stack, while data for the prediction residual is being transmitted in as a background process to the remote client.

Figure 7:
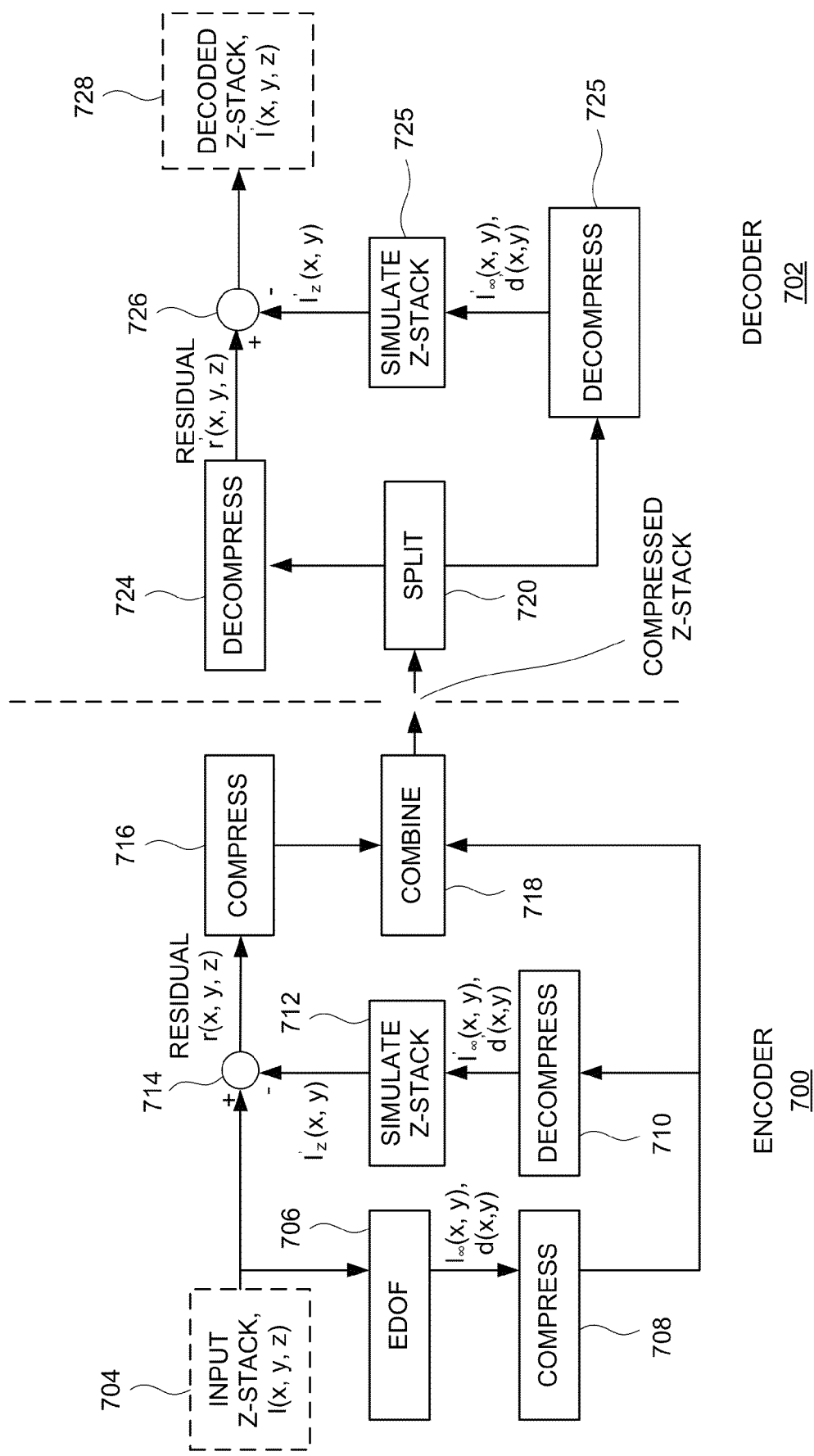
FIG. 7 depicts configurations for encoder and decoder of Z-stack, in accordance with exemplary embodiments of the present invention.

FIG. 7 shows the configurations for both an encoder 700 and a decoder 702 of z-stacks. In certain embodiments, an input Z-stack 704 represented by the Expression A: I(x, y, z) [Expression A] is analyzed by the method of improving DOF of images, i.e. Extended Depth of Field (EDOF) 706, to produce the all-focus image and the depth map. Based on the principles of the present invention, the method for improving DOF comprises combining a sequence of images captured from different focal distances to form a single all-focus image.

In certain embodiments, an aspect of the present invention is use of the DOF simulation as described in the 3832 application. The method for simulating DOF in microscopic imaging comprises approximating a sequence of images captured by a microscope using a depth map and an all-focus image. The DOF simulation module 118 takes as input an all-focus image and corresponding depth map and produce images with simulated depth of field that approximate the appearance of the original Z-stack to reduce the size of transmitted data files. The output of the DOF simulation module 118, i.e. a simulated Z-stack, is used as a prediction for encoding the Z-stack using the encoder. Simulated Z-stacks act as a low-bandwidth approximation of the original Z-stack that may be used to progressively transmit the Z-stack such that the perceived user delay is minimized.

The step of combining the sequence of images captured from different focal distances to form a single all-focus image comprises computing a focus measure at every pixel, finding multiple candidate values for an all-focus pixel based on the focus measure and blending the candidates together according to the focus measure in order to determine a final all-focus image. The focus measures for each pixel are combined to form a depth map.

The all-focus image and depth map are compressed at block 708 according to methods commonly known to those of ordinary skill in the art, for example, JPEG, JPEG-LS, and JPEG 2000, although numerous other possibilities work equally well. To be used as a prediction, the compressed versions of the all-focus image and the depth-map represented by Expressions D and E: $I_\infty(x, y)$ [Expression D] and $d(x, y)$ [Expression E] are decompressed at block 710. As shown in FIG. 7, the decompressed versions of the all-focus image and depth-map are represented by Expressions F and G: $I'_\infty(x, y)$ [Expression F] and $d'(x, y)$ Expression G. The prime notation (') here and elsewhere indicates that the quantities marked with the prime notation as a superscript may differ from the original quantities due to lossy compression. As shown in FIG. 7, the block 712, "Simulate Z-Stack", produces the simulated Z-stack represented by Expression H: $I'_Z(x, y)$. [Expression H].

The simulation of the Z-stack is performed by the DOF simulation module 118. The simulated Z-stack 714 is subtracted from the input Z-stack 704 at block 714 to form a prediction residual represented by Expression I: $r(x, y, z)$ [Expression I]. The prediction residual is then compressed at block 716 and combined at block 718 with the compressed all-focus image and depth map, represented by the Expressions D and E, to form the final compressed representation of the Z-stack. According to exemplary embodiments, compression methods include, among others, JPEG, JPEG2000, lossless JPEG (JPEG-LS), H.264, MPEG-4, MPEG-2, and 3-D image coding methods such as 3-D SPIHT wavelet-based coding. To decode the compressed Z-stack, the compressed versions of $I_\infty(x, y)$ and $d(x, y)$ are first split at block 720 and decompressed at blocks 722 and 724 to yield $I'_\infty(x, y)$ and $d'(x, y)$, which are used by simulate block 725 to form the Z-stack approximation $I'_Z(x, y)$. The approximation is added at block 726 to the decompressed Z-stack residual $r'(x, y, z)$ to form the final decoded Z-stack $I'(x, y, z)$ 728.

Although not explicitly shown in FIG. 7, additional information is necessary to perform the simulation of the Z-stack. In particular, it is necessary for the encoder to indicate parameters that describe how strongly out-of-focus blurring depends on depth, and store these in the compressed bit stream. These parameters are determined by the EDOF block 706.

As shown in FIG. 6, the simulated Z-stack provides a visually similar approximation of the original Z-stack. In certain embodiments, the simulated Z-stack data is effectively used for progressive representation of the original Z-stack. Utility of progressive representations is well known, such as Progressive Graphics File (PGF), progressive JPEG images on the Internet: In use, instead of an image appearing row-by-row, an approximation of the whole image rapidly appears to give the viewer a quick overview of the entire image; then the quality of the approximation improves as the remainder of the file is downloaded. The effect is to give the viewer the impression of faster loading times, even though the total time required to download the image might be the same as for a row-by-row representation. The progressive coding of Z-stacks operates in the same way.

Figure 8:
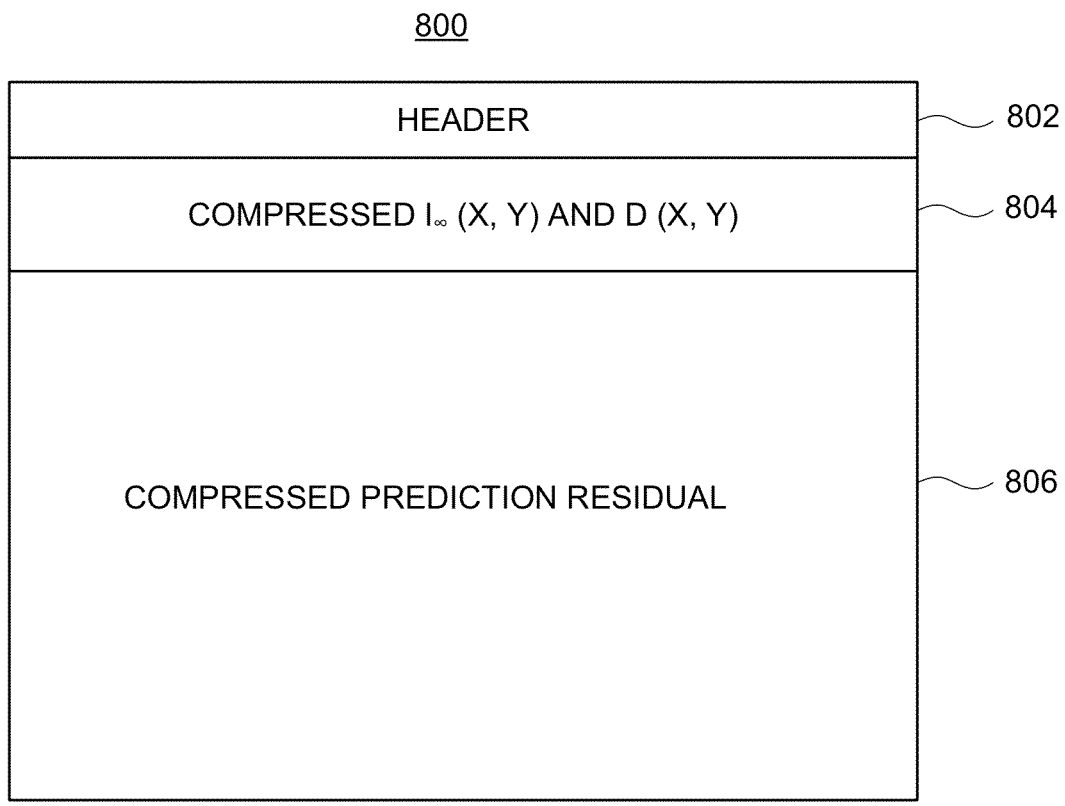
FIG. 8 depicts a representation of a layout for a progressively compressed Z-stack, in accordance with exemplary embodiments of the present invention.

FIG. 8 shows a representation 800 of a high-level layout for a progressively compressed Z-stack. As shown in FIG. 8, the representation required for approximating the Z-stack, the compressed versions of the all-focus image and the depth-map represented by the Expressions D and E: $I_\infty(x, y)$ [Expression D] and $d(x, y)$ [Expression E], require substantially fewer bits than is required for full Z-stack. The representation 800 comprises a header 802 for storing meta-data or data relevant to the file information stored therein, a portion for storing the compressed all-focus image and depth map 804, and a portion for storing the compressed prediction residual 806.

In certain embodiments, images in digital pathology are often very large, and thus their compressed versions use methods such as hierarchical- and/or tile-based representations. In hierarchical- and/or tile-based representations, the high-level layout differs from the representation of FIG. 8 in that the overall representation is split into multiple parts to accommodate the particular representation. Nevertheless, the basic pattern follows that of FIG. 8: A small number of bits are required for the Z-stack approximation, and a much larger number of bits are required for the remainder of the Z-stack data. The header 802 contains ancillary information needed for a decoder to understand the data such as format, length of fields, an indication of the format used to store the file, dimensions, number of images for z-stacks, color information such as color space indication, or information about more general spectral characteristics, number of bits used to represent each color sample, parameters needed to perform the EDOF simulation, i.e., those mentioned previously in [0047] and pixel aspect ratio.

In certain embodiments, the importance of the representation 800 of FIG. 8 is evident upon consideration of the timing of events initiated by a viewer of the Z-stack. In general scenarios, the viewer is separated from the source data by long distances, and the viewer relies on network transmission of the desired Z-stack. Due to bandwidth constraints, there are delays associated with transmission of the file.

Figure 9:
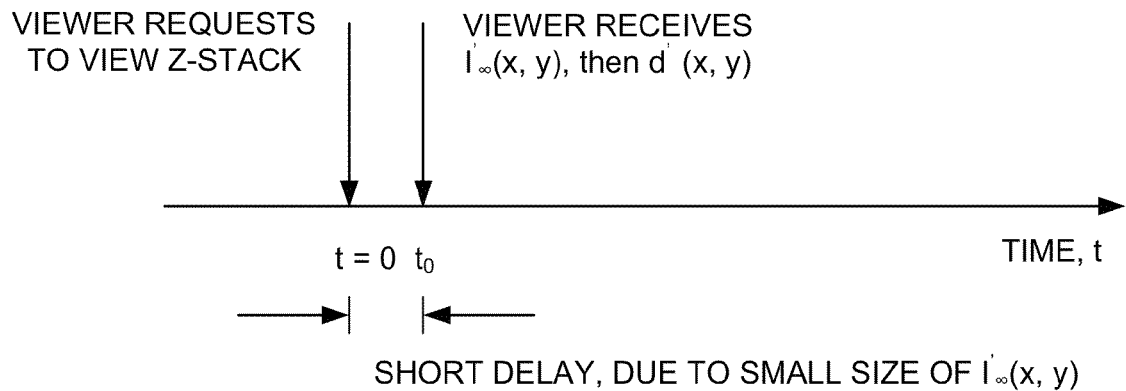
FIG. 9 depicts a timing diagram exhibiting delay in viewing all-focus image, in accordance with exemplary embodiments of the present invention.

FIG. 9 shows a delay in viewing all-focus image through a timing diagram. After initiating a request to view Z-stack, the user has to wait for a short period of time to view the all-focus image because of its low bandwidth requirements. It must be noted that the compressed representation of the all-focus image $I'_\infty(x, y)$ is smaller than the representation of Z-stack. When the viewer requests to view a Z-stack at time t=0, a small network delay occurs while transmitting the all-focus image to the viewer. The z-stack is finally delivered at time $t_0$.

In many cases, the all-focus image is all that the viewer requires, in which case there is no need to transmit other parts of the compressed Z-stack. However, in other cases the viewer chooses to browse through the actual Z-stack instead of the all-focus image; in such cases, the viewer expects to scroll quickly through the Z dimension without long delays. The timing is as indicated below in FIG. 10.

Figure 10:
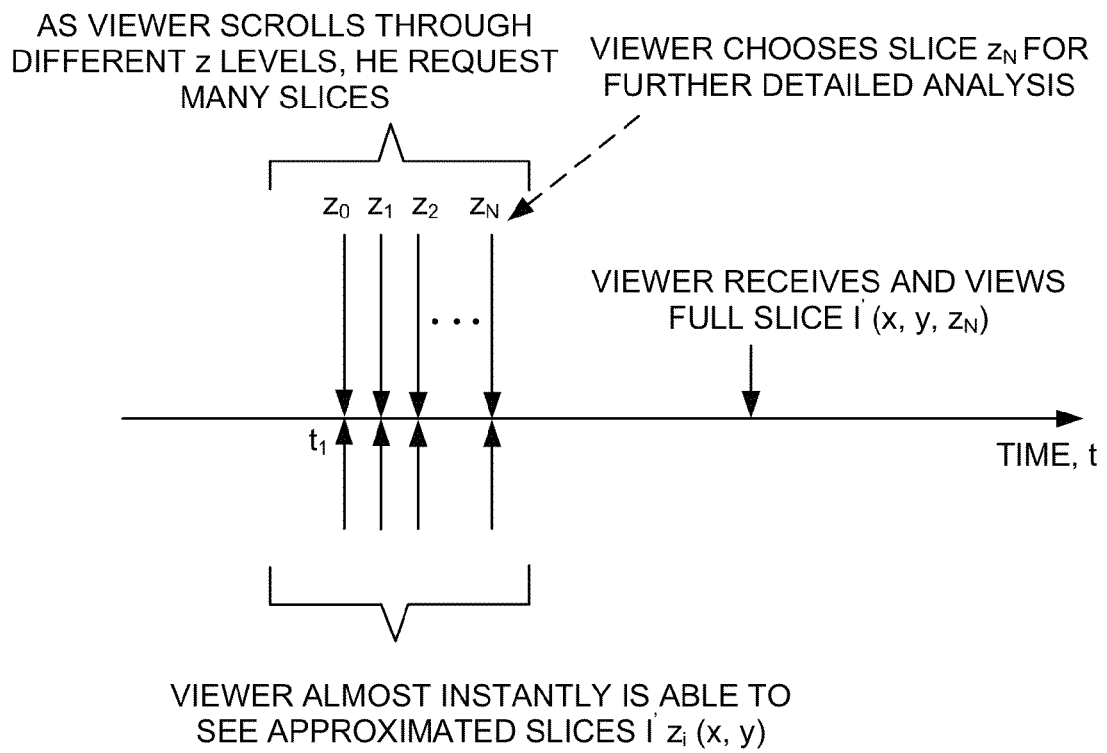
FIG. 10 depicts availability of the Z-stack for viewing, in absence of completely downloaded Z-stack, in accordance with exemplary embodiments of the present invention.

FIG. 10 shows the availability of the Z-stack, in absence of a completely downloaded Z-stack. This is possible because with the low bandwidth Z-stack approximation, the images are approximated quickly without requiring transmission of additional bits. While browsing the approximated Z-stack, the image processing module 116 is downloading the full Z-stack in the background. In certain scenarios, if the user settles on a single image to analyze, a small delay is required for the image processing module 116 to finish downloading the requested image data for the image.

In certain embodiments, at a time represented by Expression J: $t=t_1>t_0$ [Expression J], a user begins to scroll or browse through the Z-stack. Due to the progressive nature of the compression, the user is able to instantly see the approximated Z-stack. The quick availability is due to the computationally efficient nature of the DOF simulation module 118, which provides the approximated Z-stack without requiring transmission of any additional information. The user perceives virtually no delay in browsing the Z-stack. While the user is browsing, the image processing module 116 begins downloading the full decompressed representation of Z-stack in the background. Once full image of the decompressed representation of Z-stack are available, they are used for displaying to the viewer for browsing. In certain scenarios, the viewer selects a particular image for detailed analysis, if the decompressed representation of Z-stack comprising the particular image is fully downloaded in the background, then it is available for viewing. In certain other scenarios, there is additional delay in viewing by the time the downloading of the decompressed representation of Z-stack comprising the particular image is completed during which time the user has access to the decompressed approximated all-focus image for the particular image.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for compressing Z-stack microscopy images, the method being executed by a processor, comprising:
   compressing an all-focus image to form a compressed all-focus image and compressing a depth-map representation of an original Z-stack of images to form a compressed depth-map;
   computing a prediction residual as a difference between a simulated Z-stack, generated from the all-focus image and the depth-map representation, and the original Z-stack; and
   concatenating the prediction residual to the compressed all-focus image and the compressed depth-map representation to produce a compressed representation of the original Z-Stack.

2. The method of claim 1 further comprising decoding the compressed representation of the original Z-stack.

3. The method of claim 2, wherein decoding the compressed representation of the original Z-stack further comprises retrieving and decompressing the compressed all-focus image and the compressed depth-map to yield a decompressed all-focus image and a corresponding depth-map.

4. The method of claim 1 wherein compressing the all-focus image and the depth-map is performed using one of JPEG, JPEG-LS and JPEG 2000.

5. The method of claim 3 further comprising simulating a Z-stack using the decompressed all-focus image and the corresponding depth-map for generating an approximation of the original Z-stack.

6. The method of claim 5 further comprising adding the simulated Z-stack to the prediction residual to form a final Z-stack.

7. The method of claim 1 further comprising transmitting information to form the simulated Z-stack to a remote client.

8. The method of claim 7 further comprising transmitting the prediction residual as a background process while a user views the simulated Z-stack on the remote client.

9. The method of claim 1, wherein the simulated Z-stack is formed using parameters comprising a correlation between intensity of blurring and depth at each pixel of the images in the simulated Z-stack.

10. The method of claim 9 further comprising storing the parameters in the compressed representation of the original Z-Stack.

11. An apparatus for compressing Z-stack microscopy images comprising:
   a digital microscope for capturing a sequence of images of a specimen at different focus depths forming an original Z-stack; and
   an image processing module for managing compressing the Z-stack comprising:
      a depth of field (DOF) simulation module for generating a simulated Z-stack based on the original Z-stack;
      an all-focus image generator for generating an all-focus image for the original Z-stack;
      a depth-map generator for generating a depth-map corresponding to the all-focus image; and
      a codec for compressing the all-focus image to generate a compressed all-focus image, compressing the depth-map to generate a compressed depth-map, computing a prediction residual as a difference between the simulated Z-stack and the original Z-stack and concatenating the prediction residual to the compressed all-focus image and the compressed depth-map to produce a compressed representation of the original Z-stack.

12. The apparatus of claim 11 wherein the codec further decodes the compressed representation of the original Z-stack.

13. The apparatus of claim 12, wherein the codec further retrieves and decompresses the compressed all-focus image and corresponding depth-map and to yield a decompressed all-focus image and a corresponding depth-map.

14. The apparatus of claim 11 wherein compressing the all-focus image and the depth map is performed using one of JPEG, JPEG-LS and JPEG 2000.

15. The apparatus of claim 13 wherein the codec further simulates a Z-stack using the decompressed all-focus image and the corresponding depth-map for generating an approximation of the original Z-stack.

16. The apparatus of claim 15 wherein the codec further adds the simulated Z-stack to the prediction residual to form a final Z-stack.

17. The apparatus of claim 11 wherein the image processing module further transmits information to form the simulated Z-stack to a remote client.

18. The apparatus of claim 17 wherein the image processing module further transmits the prediction residual as a background process while a user views the simulated Z-stack on the remote client.

19. The apparatus of claim 11, wherein the DOF simulation module further simulates the Z-stack using parameters comprising a correlation between intensity of blurring and depth at each pixel of the images in the simulated Z-stack.

20. The apparatus of claim 19, wherein the DOF simulation module further stores the parameters in the compressed representation of the original Z-stack.

* * * * *